United States Patent
Nakajima et al.

(10) Patent No.: US 8,429,109 B2
(45) Date of Patent: Apr. 23, 2013

(54) SEGMENTED GRAPHICAL REPRESENTATIONS FOR RECOMMENDING ELEMENTS

(75) Inventors: Taido Nakajima, Cupertino, CA (US); Pareet Rahul, Markham (CA)

(73) Assignee: Apple Inc., Cupertino, CA (US)

( * ) Notice: Subject to any disclaimer, the term of this patent is extended or adjusted under 35 U.S.C. 154(b) by 704 days.

(21) Appl. No.: 12/562,811

(22) Filed: Sep. 18, 2009

(65) Prior Publication Data
US 2011/0071977 A1    Mar. 24, 2011

(51) Int. Cl.
*G06F 17/00* (2006.01)
*G06F 3/00* (2006.01)

(52) U.S. Cl.
USPC ............................................. 706/45; 715/700

(58) Field of Classification Search ........................ None
See application file for complete search history.

(56) References Cited

U.S. PATENT DOCUMENTS

| | | | |
|---|---|---|---|
| 5,616,876 | A | 4/1997 | Cluts |
| 7,081,579 | B2 | 7/2006 | Alcalde et al. |
| 2005/0038819 | A1 | 2/2005 | Hicken et al. |
| 2009/0069912 | A1 | 3/2009 | Stefik |

OTHER PUBLICATIONS

Lendino, "Apple iTunes 8 (Winter 2009)," Review date Jan. 7, 2009, pp. 1-3.

*Primary Examiner* — Alan Chen
(74) *Attorney, Agent, or Firm* — Kilpatrick Townsend & Stockton LLP

(57) ABSTRACT

Systems, methods and machine-readable media are disclosed for providing segmented graphical representations of elements, such as songs, videos, pictures, graphics, or address book contacts. In some embodiments, an electronic device may identify remote and/or local elements based on a seed element and may display a segmented graphical representation of the seed element (e.g., a tiled album cover). At least one of the segments may be associated with one or more of the identified elements. In response to receiving a user selection of a segment, the electronic device may perform any of a number of suitable actions based on the associated elements. For example, for remotely stored media elements, the electronic device can retrieve and play a preview of the media elements from a server.

12 Claims, 7 Drawing Sheets

SEGMENTED GRAPHICAL REPRESENTATIONS FOR RECOMMENDING ELEMENTS

FIELD OF THE INVENTION

This is directed to an application for recommending elements, such as songs, videos, pictures, address books, or other electronic files.

BACKGROUND OF THE DISCLOSURE

Today's portable electronic devices, such as cellular telephones and portable media players, have large storage capabilities. Users can therefore maintain large collections of music and other data types on their electronic devices. To add music and other files to their collections, users can download or purchase files from a server, such as from an online music store.

Current portable electronic devices, however, are limited in their ability to present information to users. For example, portable electronic devices commonly have limited interfaces for presenting users' music collections or for recommending songs for purchase. These electronic devices may display music collections or recommendations using textual lists of songs. Moreover, online music store interfaces for portable electronic devices may limit their recommendations to listing featured songs or to listing the most popular downloads.

SUMMARY OF THE DISCLOSURE

Systems, methods, and machine-readable media are disclosed for providing a segmented graphical representation of an element, such as a media element or an address book contact. The segmented graphical representation may be provided by any suitable electronic device, such as a portable media player or cellular telephone, and may be used as part of a user interface for recommending or identifying other elements that may be of interest to the user.

In some embodiments, the electronic device can provide a segmented graphical representation of a seed element, such as a media element that is currently playing on the electronic device or an address book contact that the user is currently on a telephone call with. The segmented graphical representation may be an album cover, a picture of an artist or contact, or any other suitable graphic or picture. In some embodiments, the graphical representation may be segmented into a number of tiles or may include a mosaic.

In some embodiments, the segments in a segmented graphical representation may each be associated with at least one element recommended based on the seed element. For example, the electronic device may identify a number of elements based on the seed element and may associate each of the segments with at least one of the identified elements. The identified elements may include elements that are stored on the electronic device and/or elements that are stored on a remote server. For simplicity, an element stored on a user's electronic device may be referred to sometimes as a "local" element, and an element stored on a server remote from a user's electronic device may be referred to sometimes as a "remote" element.

In some embodiments, when identifying elements to recommend, an electronic device may prioritize identifying local elements over remote elements. For example, the electronic device may identify local elements, and may then determine whether the identified local elements meet a predetermined criteria (e.g., whether there are at least a predetermined number of local elements). If the local elements do not meet the predetermined criteria, the electronic device may identify remote elements. In other embodiments, the electronic device may prioritize identifying remote elements over local elements.

In some embodiments, the electronic device may be configured to perform a suitable action in response to receiving a user selection of a segment from a segmented graphical representation. For example, if the segment is associated with multiple elements, the electronic device may present a display of the multiple elements.

If the segment is associated with one element, the electronic device may perform an action associated with the one element. For example, for a remote media element, the electronic device may retrieve and play a preview of the remote media element from a server, and may provide the user with an option to purchase the remote media element. For a local media element, the electronic may play at least a portion of the local media element. For an address book contact, the electronic device may make a telephone call to the address book contact or provide more detailed information about the contact.

BRIEF DESCRIPTION OF THE DRAWINGS

The above and other aspects and advantages of the present invention will be apparent upon consideration of the following detailed description, taken in conjunction with accompanying drawings, in which like reference characters refer to like parts throughout, and in which.

DETAILED DESCRIPTION

Systems, methods, and machine-readable media (e.g., computer-readable media) are disclosed for providing segmented graphical representations of elements.

Figure 1:
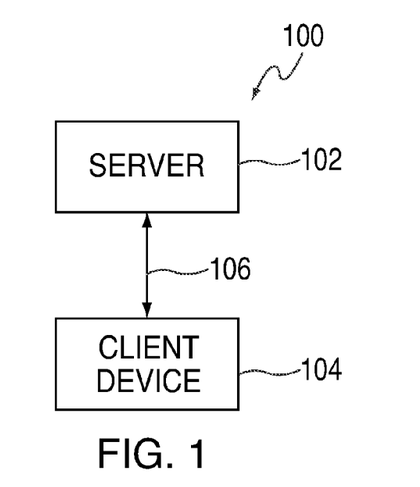
FIG. 1 is a schematic view of a client-server data system configured in accordance with various embodiments of the invention.

FIG. 1 is a schematic view of illustrative client-server data system 100 configured in accordance with various embodiments of the invention. Data system 100 can include server 102 and client device 104. In some embodiments, data system 100 can include multiple servers 102, multiple client devices 104, or both multiple servers 102 and multiple client devices 104. To prevent overcomplicating the drawing, only one server 102 and one client device 104 are illustrated.

Server 102 may include any suitable types of servers that can store and provide data to client device 104 (e.g., file server, database server, web server, or media server). Server 102 can store media and other data (e.g., metadata associated with the media), and server 102 can receive requests from client device 104 to obtain data. For example, server 102 can receive requests to obtain media elements, such as one or more songs, videos, or pictures, and any metadata associated with the media elements (e.g., a hyperlink to preview or purchase the music element, or genre, artist, album, album cover art, release date, beats per minute (BPM) information, producer, song writer, keywords, tags, lyrics, vocals, or bass line information associated with a music element). The requests may include requests to download or stream the media elements, or requests to download metadata without the media element. Responsive to the requests, server 102 can locate and provide the requested songs and/or the metadata associated with the songs.

In some embodiments, server 102 can obtain and process data from one or more client devices 104. For example, server 102 can collect information on playlists of media elements created by users of various client devices 104. Using the collected information, server 102 can determine which media elements are commonly grouped or played with one another. Upon request by a particular client device 104, server 102 can use this information to identify or recommend media elements based on at least one of the media elements stored on the particular client device 104. The element used to identify the other elements may be referred to as the "seed element," and the technique of identifying commonly-grouped elements may be referred to as a "seed-based grouping" feature.

In some embodiments, server 102 can use a seed other than a media element to identify a music group. Server 102 may seed the seed-based grouping feature using, for example, metadata about an element. In these embodiments, server 102 can use any suitable approach to identify other elements based on the metadata. For example, server 102 can identify elements stored on that client device 104 that have the same or a similar/related metadata, or server 102 can use the element as a seed and eliminate any identified songs that do not have compatible metadata.

Server 102 can communicate with client device 104 over communications link 106. Communications link 106 can include any suitable wired or wireless communications link, or combinations thereof, by which data may be exchanged between server 102 and client device 104. For example, communications link 106 can include a satellite link, a fiber-optic link, a cable link, an Internet link, or any other suitable wired or wireless link. Communications link 106 may enable data transmission using any suitable communications protocol supported by the medium of communications link 106. Such communications protocols may include, for example, Wi-Fi (e.g., a 802.11 protocol), Ethernet, Bluetooth (registered trademark), radio frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, any other communications protocol, or any combination thereof.

Client device 104 can include any electronic device capable of providing a graphical representation of elements, such as a segmented graphical representation of an electronic file (e.g., a song, video, picture, or address book contact). Client device 104 may be operative to communicate with server 102. For example, client device 104 can include a portable media player (e.g., an iPod), a cellular telephone (e.g., an iPhone), pocket-sized personal computers, a personal digital assistance (PDA), a desktop computer, a laptop computer, and any other device capable of communicating via wires or wirelessly (with or without the aid of a wireless enabling accessory device).

In some embodiments, server 102 may have any of the features and functionalities of a client device 104, or at least one of multiple client devices 104 can provide any of the capabilities discussed above in connection with server 102. For example, in addition to or instead of communicating with server 102, multiple client devices 104 may communicate with one another, such as through a peer-to-peer connection. Using the peer-to-peer connection, one of devices 104 may provide elements (e.g., media elements, address book contacts, etc.) and any associated metadata to another one of devices 104. Thus, while the disclosure generally refers to devices (e.g., client devices 104) that obtain and process data and metadata from a server, it should be understood that the devices may also use the disclosed techniques on content obtained from another client device.

Figure 2:
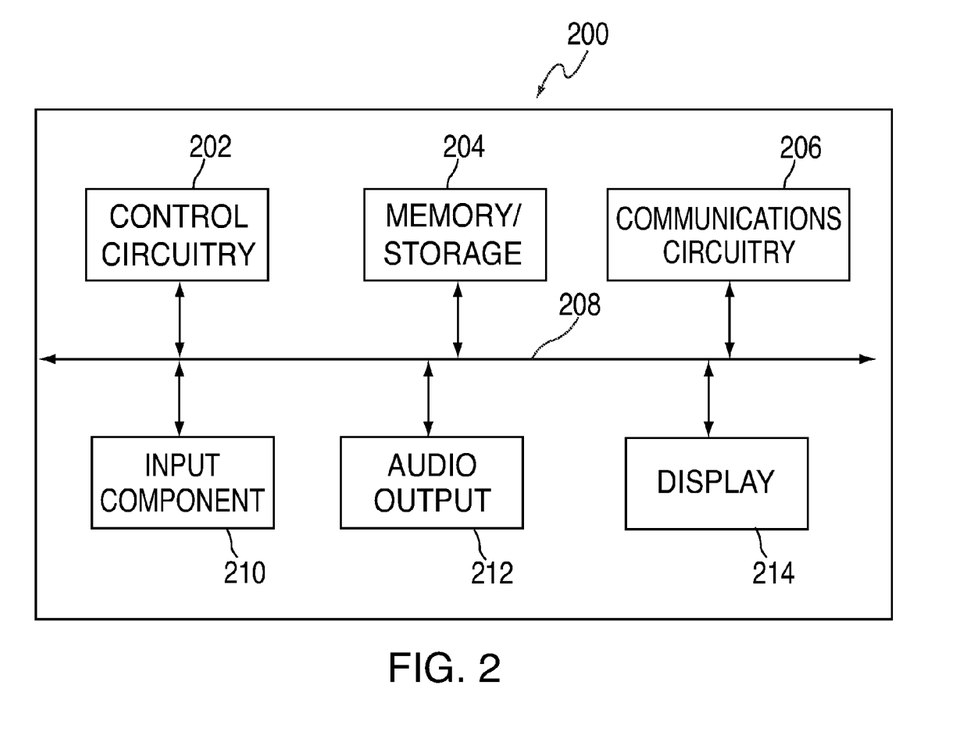
FIG. 2 is a schematic view of an electronic device configured in accordance with various embodiments of the invention.

Referring now to FIG. 2, a schematic view of illustrative electronic device 200 is shown. Electronic device 200 can be a device that is the same or similar to client device 104 (FIG. 1), or can be a device not operative to communicate with a server. Electronic device 200 can include control circuitry 202, memory/storage 204, communications circuitry 206, bus 208, input component 210, audio output 212, and display 214. Electronic device 200 can include other components not shown in FIG. 2, such as a power supply for providing power to the components of electronic device. Also, while only one of each component is illustrated, electronic device 200 can include more than one of some or all of the components.

Control circuitry 202 can control the operation and various functions of device 200. For example, as described in greater detail below, control circuitry 202 can direct display 214 to present a segmented graphical representation of a first element, and can identify other elements associated with the first element to recommend to the user. Control circuitry 202 can include any components, circuitry, or logic operative to drive the functionality of electronic device 200. For example, control circuitry 202 can include one or more processors acting under the control of an application and operating system.

In some embodiments, the application can be stored in memory/storage 204. Memory/storage 204 can include any suitable combination of non-volatile and volatile memories, such as cache memory, Flash memory, random access memory (RAM) (e.g., DDR RAM and/or SRAM), read only memory (ROM), a hard drive, an EPROM, EEPROM, or any combination thereof. In some embodiments, memory/storage 204 can include a memory module specifically dedicated to storing firmware for control circuitry 202, such as for device applications (e.g., operating system, user interface functions, and other processor functions).

In some embodiments, memory/storage 204 may include memory modules operative to provide mass storage for electronic device 200. Memory/storage 204 can be used by control circuitry 202 to store music elements and other types of media elements and electronic files (e.g., text-based files, pictures, graphics, and an address book of contacts). Memory/storage 204 can store information or metadata associated with locally stored and remotely stored elements, such as user-generated or automatically-created playlists, seed-generated groupings information, genre, artist, album, album cover art, date, BPM, lyrics, vocals information, bass line information, or any other suitable information for each element. In some embodiments, the media elements and associated information can be obtained from a server, such as server 102. Memory/storage 104 can also store any other suitable information, such as preference information (e.g., music playback preferences), lifestyle information, exercise information (e.g., obtained from exercise monitoring system), transaction information (e.g., credit card information), subscription information (e.g., for podcasts or television shows), and telephone information (e.g., an address book).

Bus 208 may provide a data transfer path for transferring data to, from, or between control circuitry 202, memory/storage 204, communications circuitry 206, and some or all of the other components of electronic device 200.

Communications circuitry 206 can enable electronic device 200 to communicate with other devices, such as with a server (e.g., server 102 of FIG. 1). For example, communications circuitry 206 can include Wi-Fi enabling circuitry that permits wireless communications according to one of the 802.11 standards or a private network. Other wired or wireless protocol standards, such as Bluetooth, can be used in addition or instead.

Input component 210, audio output 212, and display 214 can provide a user interface for a user to interact with electronic device 200. Input component 210 may enable a user to provide inputs and feedback to electronic device 200. Input component 210 can take any of a variety of forms, such as one or more of a button, keypad (e.g., computer keyboard), dial, click wheel, touch screen, or accelerometer.

Audio output 212 may provide an interface by which electronic device 200 can provide music and other audio elements to a user. Audio output 212 can include any type of speaker, such as computer speakers or headphones. Display 214 can present visual media (e.g., graphics such as album cover, text, and video) to the user. Display 214 can include, for example, a liquid crystal display (LCD), a touchscreen display, or any other type of display. Electronic device 200 can also include any other suitable type of output component in addition to or instead of audio output 214 and display 214. For example, in some embodiments, electronic device 200 can provide haptic outputs, such as vibrational outputs.

Figure 3:
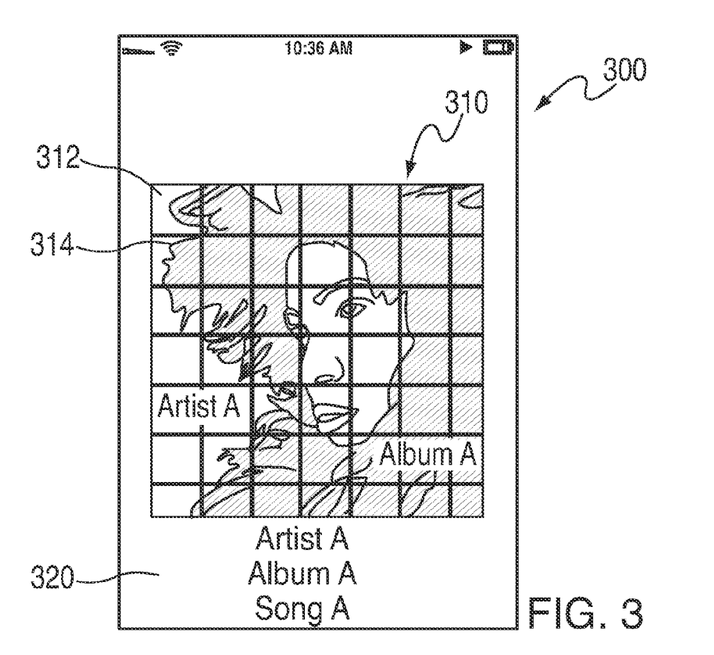
FIG. 3 is a display screen of an illustrative segmented graphical representation of a media element in accordance with various embodiments of the invention.
Figure 4:
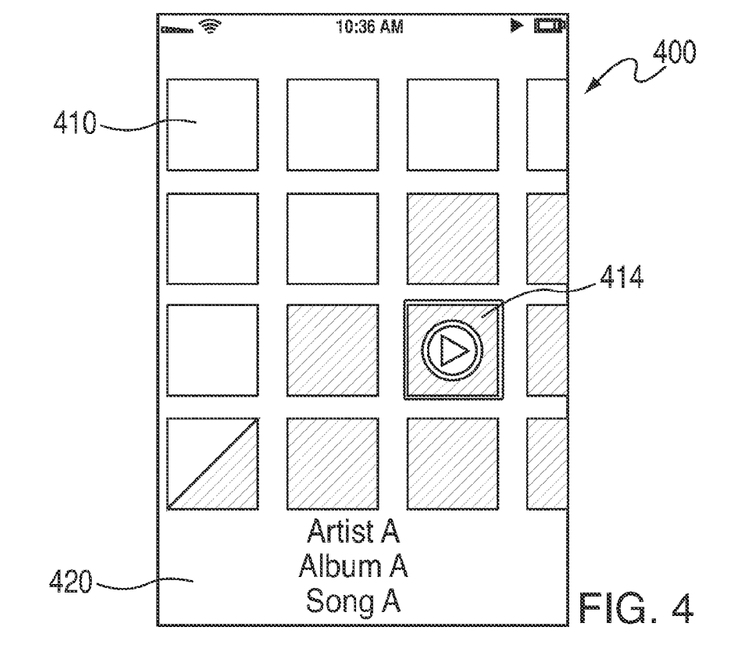
FIG. 4 is a display screen showing multiple media elements associated with the media element of FIG. 3 in accordance with various embodiments of the invention.
Figure 5:
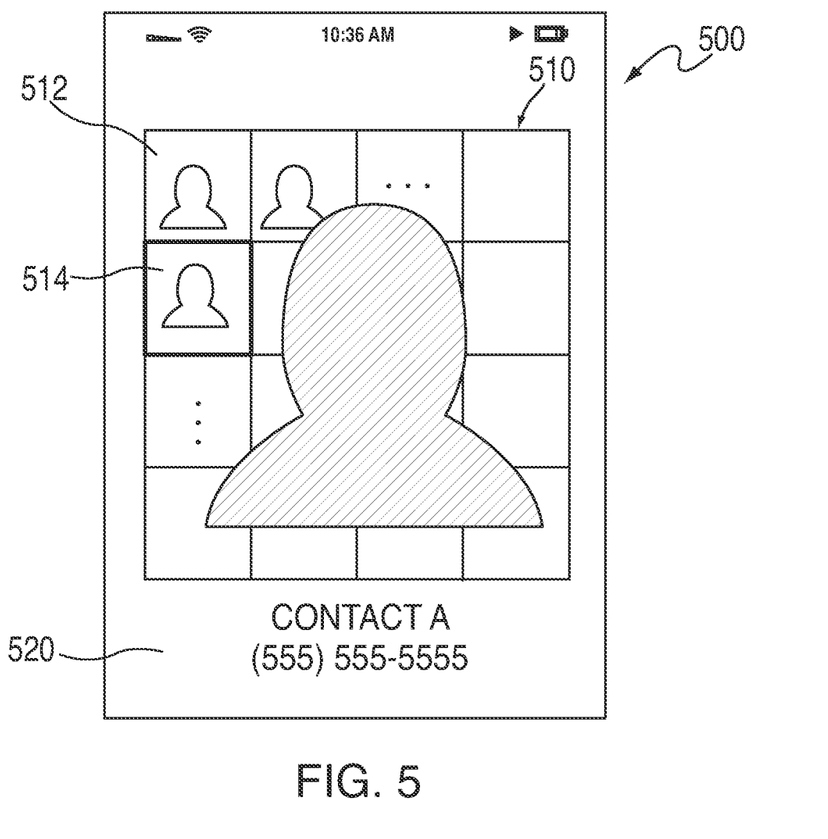
FIG. 5 is a display screen of an illustrative segmented graphical representation of an address book contact in accordance with various embodiments of the invention.

In some embodiments, electronic device 200 can recommend or identify elements based on a seed element, such as a seed song, video, picture, graphic, address book contact, or other electronic data type. For example, electronic device 200 can use the seed-based grouping feature to identify local and/or remote songs that are associated with a song playing on electronic device 200. Electronic device can provide a graphical representation of the seed element, where the graphical representation may be segmented to indicate the availability of recommendations. FIGS. 3 and 4 provide an example of a segmented graphical representation of a seed song, and FIG. 5 provides an example of a segmented graphical representation of a seed address book contact.

Referring first to FIG. 3, a display screen with an illustrative segmented graphical representation is shown, which can be provided by various embodiments of electronic device 200. In some embodiments, electronic device 200 may provide display screen 300 while playing music to a user, such as in a "now playing" view mode. Display screen 300 can include a segmented graphical representation 310 of the song that is currently playing. Graphical representation 310 (sometimes referred to as album cover 310) may be or include album cover art, a picture or graphic of the artist, or any other suitable graphical representative of the song being played. Display screen 300 may also include an information region 320 for providing attributes about the playing song, which is referred to as "Song A" in this illustration. The attributes can include any suitable metadata associated with Song A such as the title, artist, and album.

Graphical representation 310 can include or be composed of a number of segments, including segments 312 and 314. The segments can be positioned like tiles in a grid so that each segment shows a portion of the album cover art or other graphic. Graphical representation 310 can include any suitable number of segments. For example, graphical representation 310 may be composed of a 5×5, 5×7, 7×7, or 10×10 grid, where each segment may have any suitable shape (e.g., square or rectangular). The segments may all be of equal or substantially equal size, or some of the segments may be larger than other segments. For example, in some embodiments, the center of graphical representation 310 may include fewer segments so that detailed artwork near the center of representation 310 does not appear cut up.

In some embodiments, one or more of the segments in graphical representation 310 (e.g., segments 312 and 314) may each be associated with one or more other songs. Electronic device 200 may identify these other songs using Song A as the seed song and may allow a user to interact with display screen 300 to view the songs associated with a segment. In some embodiments, the user can use a "pinch in" motion directed over one or more segments on a multi-touch touch screen to view the songs associated with those segments. Alternatively or in addition, electronic device 200 may display the songs responsive to a double-tapping input directed over a segment. For example, in response to a first tap of segment 314, electronic device 200 may highlight segment 314 as illustrated in FIG. 3, and in response to a second tap, electronic device 200 may display the songs associated with segment 314. Electronic device 200 may use any technique to visually distinguish a once-tapped segment from other segments, such as changing the border, color, size, or position of the segment.

FIG. 4 is an illustrative display screen that may be displayed by electronic device 200 responsive to a user selection of segment 314 from display screen 300 (FIG. 3). Display screen 400 can include multiple graphical representations (e.g., cover art) of songs or albums associated with the seed song, such as album cover 410. For example, if a segmented graphical representation of Song A is provided in display screen 300 (FIG. 3), the songs selected for display in display screen 400 may be identified or recommended based on Song A. In some embodiments, electronic device 200 can continue playing Song A and can continue displaying attributes for Song A within information region 420 when transitioning from display screen 300 to display screen 400.

From display screen 400, the user may choose to return to display screen 300 of FIG. 3 or to view a different set of songs associated with the seed song. Electronic device 200 may, for example, return to presenting display screen 300 of FIG. 3 responsive to a "pinch out" motion received on a touch screen. Electronic device 200 may display a different set of recommended songs responsive to a flicking motion on the touch screen. For example, if the cover art displayed in display screen 400 is associated segment 314 of FIG. 3, an upward flicking motion may cause electronic device 200 to begin displaying cover art for songs associated with segment 312.

Electronic device 200 may perform any of a variety of suitable actions in response to a user selection of an album cover, such as album cover 414. In some embodiments, electronic device 200 may play at least a portion of the song associated with the selected album cover. For example, responsive to a user selection of album cover 414, electronic device 200 may play a preview of the associated song and display a play icon overlaid on album cover 414. If the song is not stored locally on electronic device 200, electronic device 200 may retrieve and play a downloaded or streamed preview of the song from a server (e.g., server 102 of FIG. 1), and may play a local copy of the song otherwise.

In some embodiments, electronic device 200 may provide the user with an option to purchase a previewed song if the song is not locally stored on electronic device 200. In other embodiments, or if the user chooses not to buy a previewed song, electronic device 200 may allow a user to preview/buy another song by selecting a second album cover from display screen 400. Thus, using the interface illustrated and described in connection with FIGS. 3 and 4, electronic device 200 is able to provide a user-friendly way for the user to access and preview a variety of songs. These songs may be similar or related to a song that the user is already interested in—that is, similar or related to a song that the user has already chosen to play.

Electronic device 200 may select local and/or remote songs to recommend to a user using any suitable approach. In some embodiments, the songs may be selected such that their album covers can form a mosaic of the seed song's album cover (e.g., graphical representation 310). For example, album cover 410 may have a light color or shading to correspond to the background color of album cover 310 (FIG. 3), while the album covers in the lower right corner of display screen 400 may correspond to the color or shading of the hair depicted in album cover 310. To generate the mosaic of album cover 310, electronic device 200 can initially choose a number of local and/or remote songs based on the seed song (e.g., using a seed-based grouping feature, based on genre, artist, album, release date, beats per minute (BPM) information, producer, song writer, keywords, tags, lyrics, or vocals), and can narrow down the chosen songs based on the colors found on album cover 310.

Electronic device 200 can use a mosaic-generating algorithm to determine how to narrow down the songs that are initially chosen. Electronic device 200 may run any known or future-developed mosaic-generating software that, given a library of album covers, can determine which of the album covers are suitable for use in the mosaic. The mosaic-generating algorithm can operate based on a variety of criteria. For example, the mosaic-generating algorithm can select album covers such that, if the same album cover is chosen multiple times, these album covers are spaced apart by at least a predetermined distance (e.g., at least five other album covers separate songs with the same album cover).

In other embodiments, electronic device 200 can use a different approach for selecting songs for display in display screen 400 of FIG. 4. Electronic device 200 may select and organize songs based on different categories of attributes. In these embodiments, each segment of graphical representation 310 (FIG. 3) may be associated with one of the seed song's attributes, and the songs selected for display in display screen 400 may be chosen based on the attribute. For example, segment 312 (FIG. 3) may be associated with the genre attribute, and segment 314 may be associated with the artist attribute. Responsive to a user selection of artist segment 314, electronic device 200 may display cover art in display screen 400 corresponding to local and/or remote songs from the same artist, Artist A.

It should be understood that any approach may be used by electronic device 200 to select and organize songs for display in display screen 400 other than using a mosaic-based or attribute-categorizing approach. For example, in some embodiments, electronic device 200 may select a predetermined number of songs using the seed-based grouping feature, and may organize the cover art for those songs using an alphabetical, arbitrary, or any other suitable approach.

In some embodiments, electronic device 200 may prioritize identifying local songs over remote songs for display in display screen 400. For example, electronic device 200 may provide mostly or only local songs to aid a user in determining what songs from the user's own library to play next. In other embodiments, electronic device 200 may prioritize identifying remote songs over local songs for display in display screen 400. This may occur when electronic device 200 is operating in a "music discovery" setting. That is, electronic device 200 may select only or substantially more remote songs than local songs in situations where the user wants recommendations for songs to purchase from an online music store. In still other embodiments, electronic device 200 may attempt to identify a substantially equal amount of remote and local songs, or may use any other suitable approach or algorithm for choosing between remote and local songs.

In some embodiments, electronic device 200 may visually distinguish the songs displayed in display screen 400 based on their degree of affiliation with the seed song. For example, the seed-based grouping feature may provide an indication of how closely related an identified song is with the seed element. Using this information, electronic device 200 can emphasize or otherwise distinguish those songs that are more closely related to the seed song from those that are less related to the seed song. Electronic device 200 can use any suitable technique for visually distinguishing the songs, such as changing the size, shading, texture, or color of the cover art. In some embodiments, electronic device 200 may emphasize remote songs over local songs or local songs over remote songs using any of these techniques based on whether electronic device 200 prioritized identifying remote songs or local songs.

While FIGS. 3 and 4 are shown and described as providing segmented graphical representations of songs, any other types of elements may be used instead of songs. For example, display screens 300 and 400 may recommend local and/or remote videos to the user, and still shots of the video or promotional pictures may be used in place of album cover art. Alternatively, display screens 300 and 400 may be used to organize pictures or other graphics stored in electronic device 200.

In other embodiments, display screens similar to display screens 300 and 400 may be used to organize contacts in an address book. The graphical representations may include photos of the contacts instead of album covers, for example. Each segment of a seed contact's graphical representation may be associated with a contact group that the seed contact belongs to or to contacts having similar/related contact information. For example, selecting a first segment from a photo of the seed contact may cause electronic device 200 to display contacts that work in the same company as the seed contact, while selecting a second segment may cause electronic device 200 to display other contacts that went to the same school as the seed contact. In some embodiments, a segment can indicate the underlying contacts that are displayed responsive to selecting the segment. For example, the first segment may provide a logo of the company that the seed contact and the underlying contacts work for. Unlike an alphabetically organized address book, this interface may allow electronic device 200 to provide an address book that is intuitive to the user, and may enable a user to quickly call a number of users from the same contact group in succession.

In still other embodiments, segmented graphical representations can be provided for any other suitable type of electronic file, such as spreadsheets, presentation files, and webpage files. Also, in some embodiments, different types of electronic files or data types can be displayed on the same display screen (e.g., both songs and videos).

In some embodiments, instead of associating each segment of a graphical representation with multiple elements, at least one of the segments may be associated with a single element. For example, in FIG. 3, each of the segments in graphical representation 310 may instead be associated with one song, and selecting a segment from display screen 300 may cause electronic device 200 to reveal cover art for the associated song and/or play at least a preview of the associated song. As another example, rather than showing graphical representation 310 as being divided into larger tiles, electronic device 200 may provide album cover 310 as a mosaic of many smaller album covers. In these mosaic embodiments, each of the smaller album covers may represent a segment, which the user can view more clearly by zooming into a section of the mosaic (e.g., using a pinch-in motion on a multi-touch screen).

FIG. 5 shows another embodiment of a display screen with a segmented graphical representation, where the segments may each be associated with one element. Display screen 500 may be provided by electronic device 200 and may include segmented graphical representation 510 of an address book contact, or "seed contact." Information about the seed contact, such as the name and telephone number of the seed contact, may be provided in information region 520. In some embodiments, information region 520 can provide the contact method that is most commonly used to contact the seed contact (e.g., home telephone number, mobile telephone number, work telephone number, e-mail address, etc.) or most appropriate for the current scenario. For example, if the user is presently on a telephone call with the seed contact, information region 520 can provide the telephone number used for the telephone call. Electronic device 200 may provide display screen 500 during a telephone call with the seed contact or while the user is browsing the address book.

Graphical representation 510 may be a photo or other representation of a seed address book contact. The photo may be divided into a grid of segments, where at least some of the segments are associated with another contact in the address book. Each segment, such as segments 512 and 514, may provide a photo of another address book contact as well as illustrate a portion of the seed contact's photo. For example, graphical representation 510 may appear to be a grid of photos with a semi-transparent larger photo of the seed contact overlaid on top of the grid. In some embodiments, at least one of the segments may be associated with a group of contacts (e.g., family members, work contacts, school contacts, etc.) and, for these segments, electronic device 200 may provide any features or functionalities described above in connection with FIGS. 3 and 4. Instead using a seed contact's photo, electronic device 200 may provide a representation of the associated group, such as a picture of house for family members, a company logo for work contacts, and a school logo or coat of arms for school contacts.

In some embodiments, some of the segments of graphical representation 510 (or of graphical representation 310 of FIG. 3) may not be associated with other elements. For example, electronic device 200 may associate only those segments located along the perimeter of graphical representation 510 with one or more other address contacts. This way, graphical representation 510 can maintain a clean look and feel. Any other approach for selecting which segments to associate with other elements may be used instead.

For those segments associated with an address book contact, electronic device 200 may take any suitable action with respect to the contact responsive to a user selection of a segment. For example, in response to a user selection of segment 514, electronic device 200 may call the associated contact, allow the user to text message the associated contact, or may display more detailed information about the associated contact (e.g., name, home address, telephone numbers, e-mail addresses, call history, SMS information, a degree of affiliation the user has with the associated contact etc.).

FIGS. 3 and 5 show illustrative segmented graphical representations in accordance with some embodiments of the invention. In other embodiments, the graphical representation of a seed element may be segmented using a different approach. It should therefore be understood that a segmented graphical representation can take on any suitable appearance. In general, a "segment" may refer to any part of a display screen that represents a portion of a seed element's graphical representation and at least one other element associated with the seed element.

Referring now to FIGS. 6-9, flowcharts of illustrative processes are shown in accordance with various embodiments of the invention. The processes may be executed by an electronic device, such as electronic device 200 of FIG. 2, or the steps may correspond to machine-readable instructions recorded on machine-readable media (e.g., computer-readable media, memory/storage 204 of FIG. 2). It should be understood that these processes are merely illustrative. Any of the steps may be combined, removed, or modified, and any steps may be added, without departing from the scope of the invention.

Figure 6:
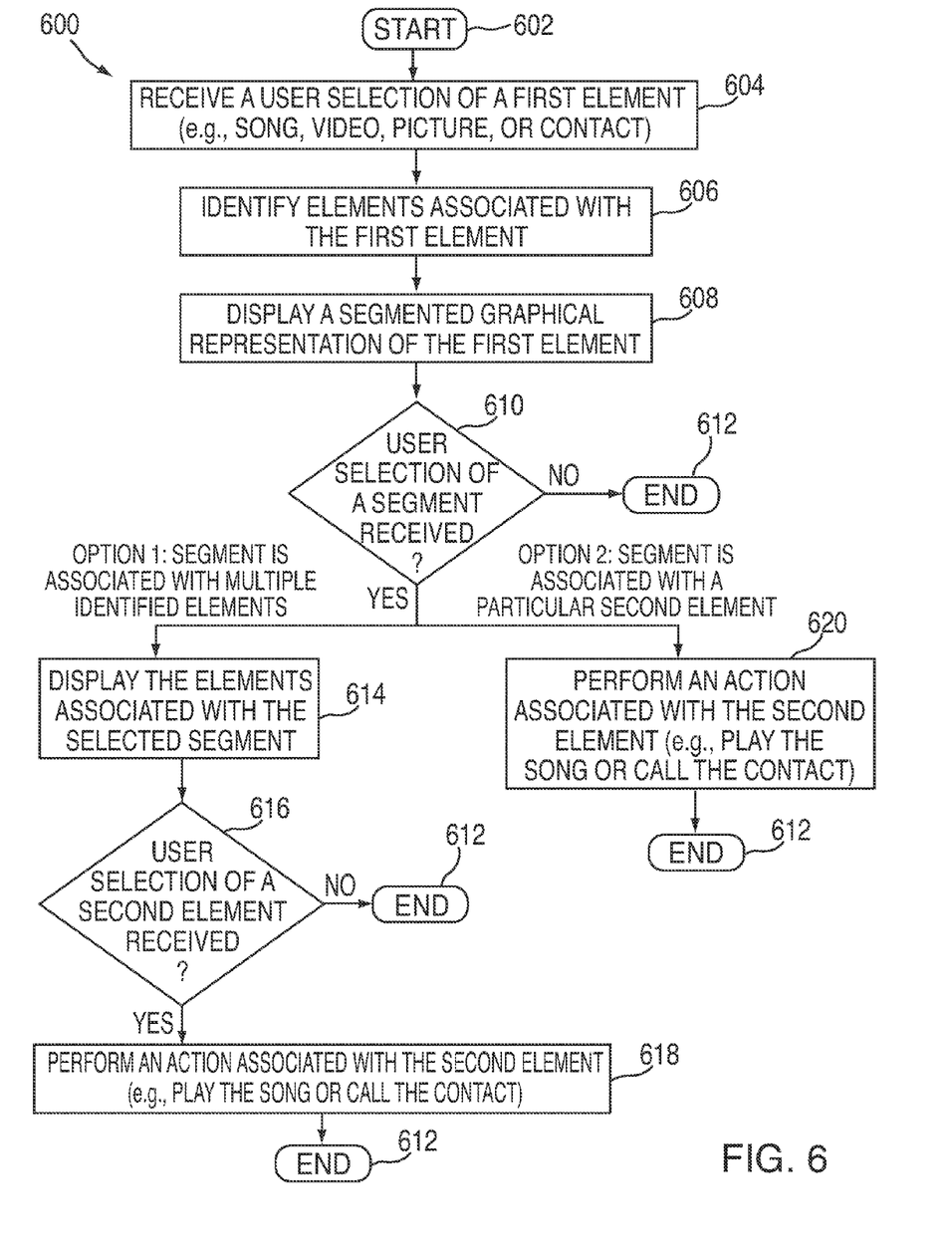
FIG. 6 is a flowchart of an illustrative process for providing a segmented graphical representation of an element in accordance with various embodiments of the invention.

Referring first to FIG. 6, a flowchart of illustrative process 600 is shown for providing a segmented graphical representation of an element. Process 600 may begin at step 602. At step 604, the electronic device may receive a user selection of a first media element. The first element may be, for example, a media element (e.g., audio element, video element, audio/visual element, graphic, or picture), an address book contact, or any other electronic file or data type.

At step 606, the electronic device may identify elements that are associated with the first element. For example, for a media element, the electronic device may identify other local and/or remote media elements based on the seed-based grouping feature, or based on the genre, artist, album, album cover art, release date, beats per minute (BPM), producer, song writer, keywords, tags, lyrics, or vocals of the first media element. For address book contacts, the electronic device may identify other contacts in the same contact group, having similar or related information (e.g., working at the same company), a last name with the same letter, or using any other suitable approach.

Then, at step 608, the electronic device can display a segmented graphical representation of the first element. The segmented graphical representation may be similar to the representations illustrated in FIGS. 3 and 5, or may be representations having a different appearance. Each of the segments in the segmented graphical representation may be associated with at least one of the elements identified in step 606, or a portion of the segments may each be associated with one of the elements.

At step 610, the electronic device may determine whether a user selection of one of the segments has been received. If not, process 600 may move to step 612 and end. Otherwise, process 600 may continue to step 614 or step 616.

If the selected segment is associated with multiple elements (as is the case illustrated in FIGS. 3 and 4), process 600 may continue to step 614. At step 614, the electronic device may present a display of the elements identified in step 606 that are associated with the selected segment. For example, for music elements, the display may include album cover art for the identified songs. At step 616, the electronic device may determine whether a user selection of a second element from the display of identified elements has been received. If not, process 600 can end at step 612. Otherwise, if a user selection of a second element is received, process 600 can move to step 618.

At step 618, the electronic device can perform an action associated with the second element. For example, for a media element, the electronic device can play a preview of the second element, play a full version of the second element, provide information about the second element, or add the second element to a playlist (e.g., the current playlist that includes the first element). For a selected address book contact, the electronic device may initiate a telephone call with the selected contact, provide an interface for text messaging the selected contact (e.g., via SMS), or display more detailed information about the selected contact (e.g., a call history, SMS history, a degree of affiliation that the user has with the selected contact, etc.). Process 600 may then end at step 612. Alternatively, process 600 may return to step 606, where process 600 may continue based on the second element. For example, at step 606, the electronic device may identify elements that are associated with the second element, and so on.

Returning to step 610, if the selected segment is associated with only a second element (as is the case illustrated in FIG. 5), process 600 may continue to step 620. At step 620, electronic device 200 can perform a suitable action associated with the second element, such as any of those discussed above in connection with step 618. Process 600 may then end at step 612 or return to step 606, as discussed above.

Figure 7:
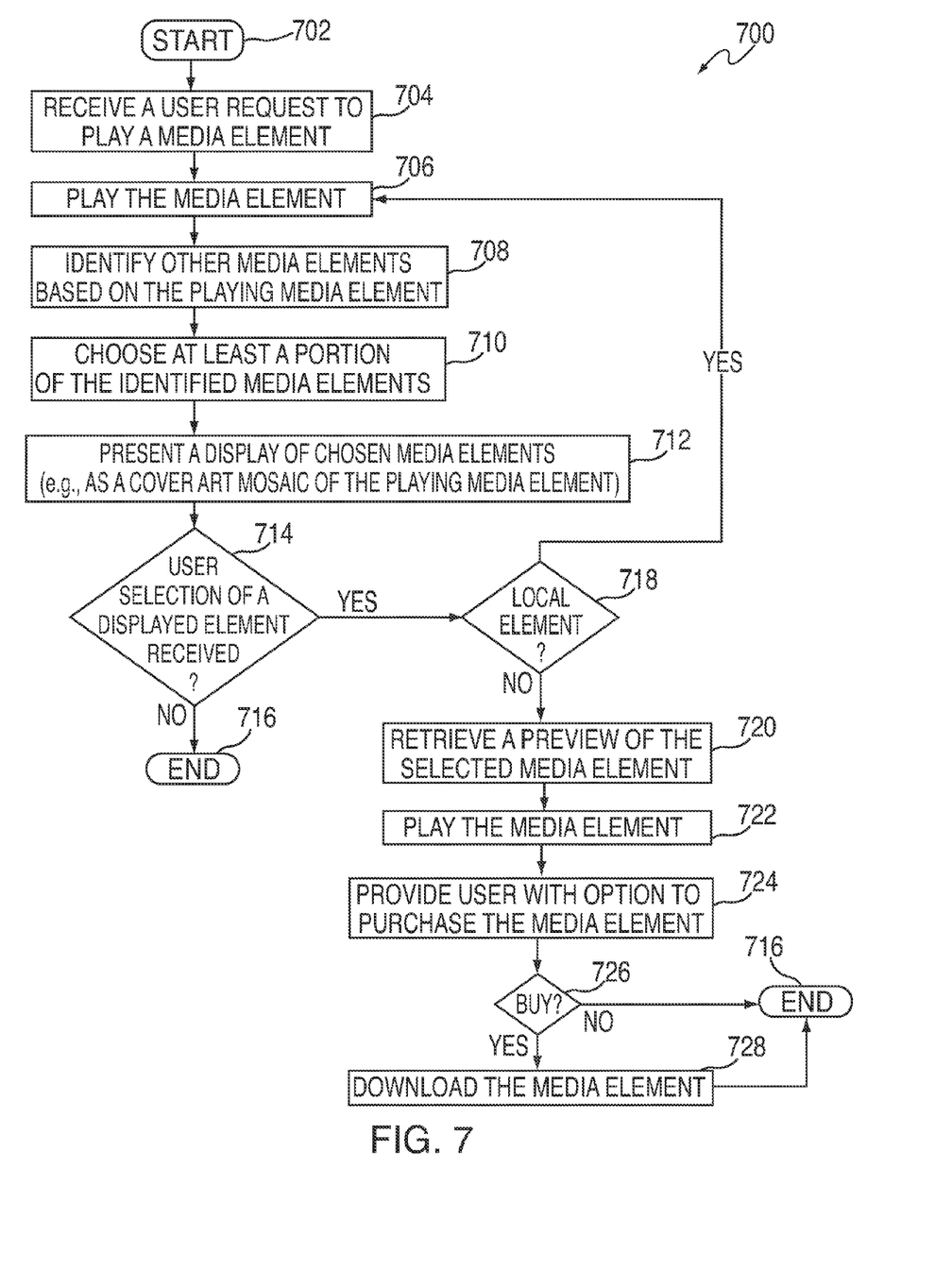
FIG. 7 is a flowchart of an illustrative process for providing and playing local and remote recommended media elements in accordance with various embodiments of the invention.

FIG. 7 is a flowchart of illustrative process 700 for providing and playing local and remote recommended media elements. Process 700 may represent a more detailed view of one embodiment of process 600 of FIG. 6 for media elements. Process 700 may begin at step 702. At step 704, the electronic device may receive a user request to play a media element, and at step 706, the electronic device may play the requested media element.

Then, at step 708, the electronic device may identify other media elements based on the playing media element. For example, the electronic device may identify other media elements based on the seed-based grouping feature or any of the previously-discussed metadata associated with the playing music element. The identified media elements may be locally stored on the electronic device or remotely stored on a server (e.g., server 102 of FIG. 1). At step 710, the electronic device can choose at least a portion of the media elements identified at step 708. For example, the electronic device can use a mosaic-generating algorithm to choose those elements having artwork usable to create a mosaic for the playing media element.

Continuing to step 712, the electronic device may present a display of the chosen media elements. For example, the electronic device can display a mosaic using artwork for the chosen elements, or the electronic device can display a number of segments where each segment is associated with more than one of the chosen media elements. At step 714, the electronic device may determine whether a user selection of a displayed media element has been received. If not, process 700 may end at step 716. Otherwise, if a user selection of a media element has been received, process 700 can move to step 718.

At step 718, the electronic device can determine whether the selected media element is stored locally on the electronic device. If the media element is stored locally, process 700 may return to step 706, where process 700 may play the local element and identify other media elements based on the newly playing element at step 708. In other embodiments, the electronic device can instead play a preview of the local media element or provide the user with the option to return to step 706.

Returning to step 718, if the electronic device instead determines that the selected media element is not stored locally, the electronic device may retrieve a preview of the selected media element at step 720. For example, the electronic device may direct the user to a streaming clip of the selected media element stored on a server (e.g., server 102 of FIG. 1), such as an online music store, or the electronic device may download a clip of the selected media element. Then, at step 722, the electronic device may play the preview of the selected media element.

Continuing to step 724, the electronic device can provide the user with an option to purchase a full version of the previewed media element. If, at step 726, the user chooses not to purchase the media element, process 700 may end at step 716. Alternatively, process 700 may return to step 712 to give the user another opportunity to select a local or remote media element to play or preview/purchase. If, at step 726, the user instead chooses to purchase the media element, the electronic device can download the full media element at step 728 from the server.

Process 700 may then end at step 716. Alternatively, process 700 may move back to step 712, where the electronic device can present a display of media elements again. The display may include a graphical representation of the newly downloaded media element so that, if that element is selected again, the electronic device can determine at step 718 that the media element is now locally stored.

Figure 8:
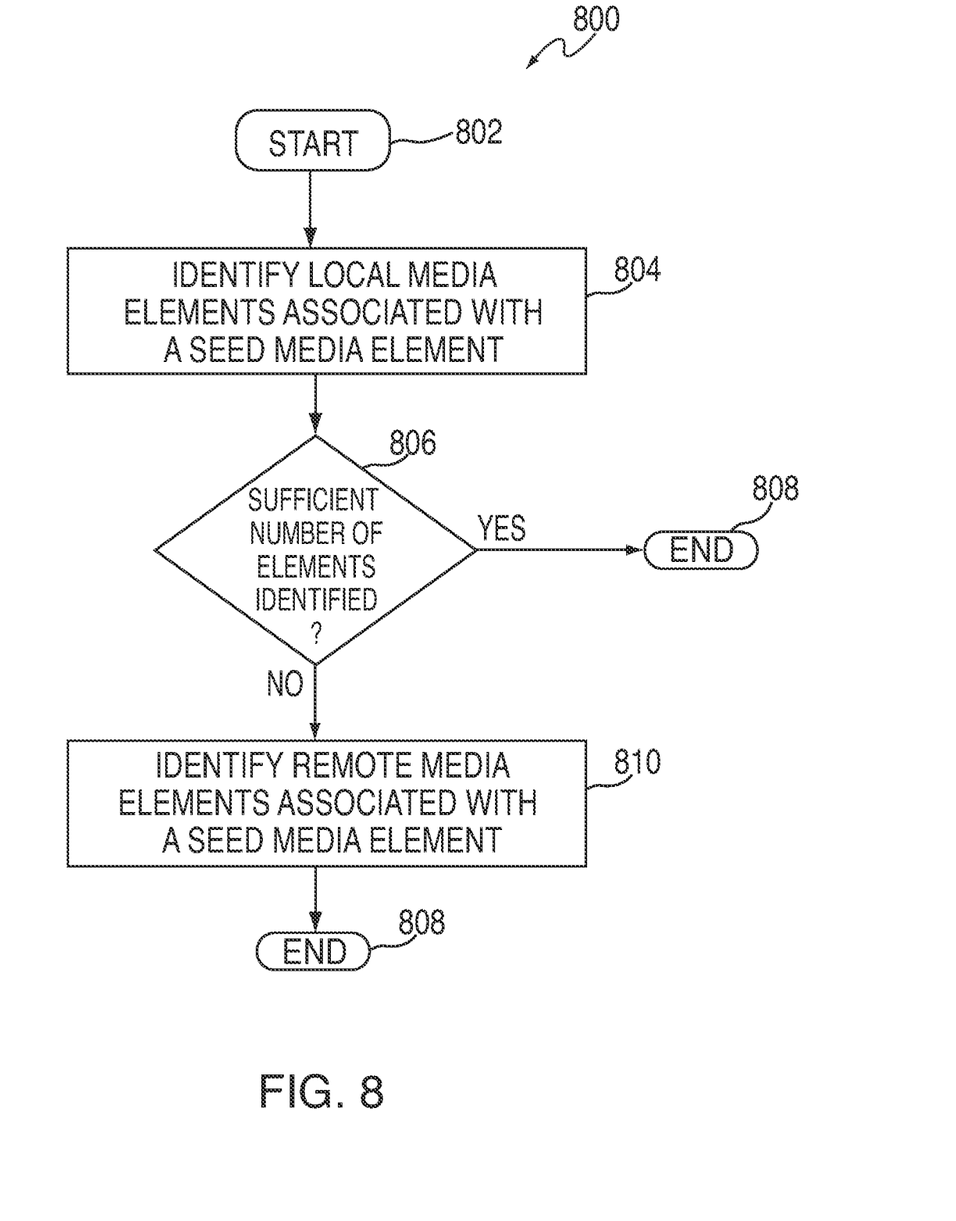
FIGS. 8 and 9 are flowcharts of illustrative processes for identifying local and remote media elements to recommend to a user in accordance with various embodiments of the invention.

Referring now to FIG. 8, a flowchart of illustrative process 800 is shown for identifying local and remote media elements to recommend to a user based on a seed media element. In some embodiments, process 800 may be a more detailed view of identifying step 606 of process 600 (FIG. 6) or identifying step 708 of process 700 (FIG. 7). In other embodiments, process 800 may be executed by the electronic device at another suitable time in processes 600 or 700 (e.g., when the element is first downloaded onto the electronic device).

Process 800 may begin at step 802. Then, at step 804, the electronic device can identify local media elements associated with the seed media element. For example, the electronic device can identify local media elements based on the seed-based grouping feature, or based on genre, artist, album, album cover art, release date, beats per minute (BPM) information, producer, song writer, keywords, tags, lyrics, vocals, or bass line information.

Then, at step 806, the electronic device may determine whether a sufficient number of media elements have been identified. The electronic device can use any suitable criteria for determining whether a sufficient number of media elements have been identified. For example, to ensure that the electronic device has enough media elements to create a mosaic of album covers or other graphics, the electronic device may determine whether the number of identified local media elements meets at least a predetermined threshold of elements, or whether the number of album covers or graphics associated with the local media elements meets at least a predetermined threshold.

If, at step 806, the electronic device determines that a sufficient number of local media elements have been identified, process 800 may end at step 808 without identifying any remote media elements. Otherwise, if the electronic device instead determines that a sufficient number of media elements have not been identified, process 800 can continue to step 810, where the electronic device can identify remote elements associated with the seed media element. Step 810 may involve, for example, requesting from a server a suitable number media elements similar to or related to the seed media element. In other embodiments, step 810 may involve identifying remote media elements using locally stored metadata about the remote elements. The selection of remote media elements may use an approach that is the same as or different from that used to select local media elements. Process 800 may then at step 808.

Process 800 illustrates one way in which the electronic device may identify local and remote elements such that selecting local elements is prioritized. That is, in this embodiment, remote elements are identified only if the number of local elements is insufficient, for example. This approach may be used by the electronic device to aid a user in determining which media elements from the user's media library go well together. It should be understood that any other approach for identifying elements where local elements are prioritized over remote elements may be used instead.

In other modes of operation, the electronic device may prioritize identifying remote songs over local songs. For example, the electronic device may have a music discovery mode, which is used to aid a user in determining which media elements the user may want to purchase. This mode of operation may therefore be used as an extension of an online media store (e.g., online music store).

Figure 9:
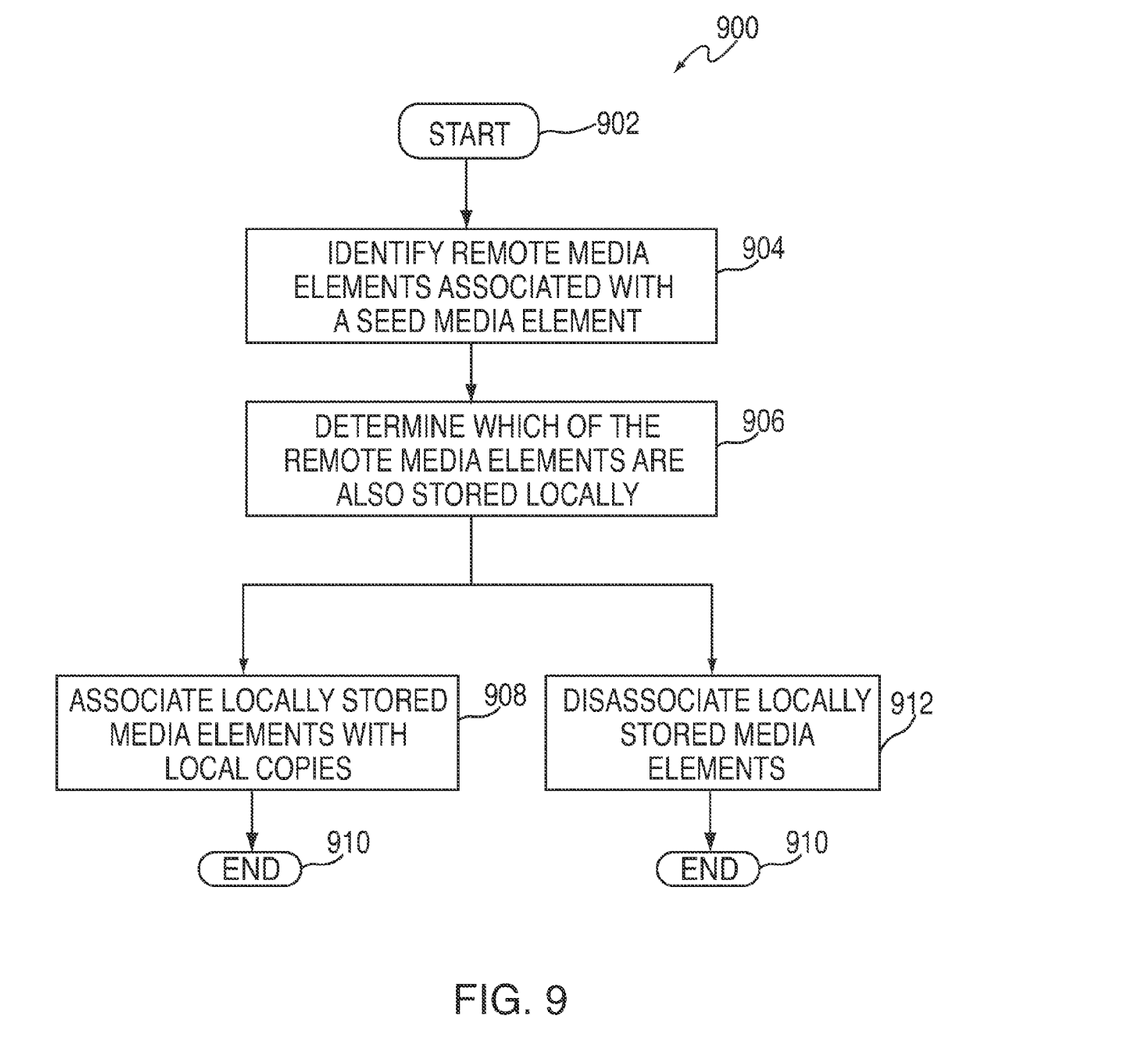

FIG. 9 is another flowchart of illustrative process 900 for identifying local and remote media elements to recommend to a user based on a seed element, where remote media elements are prioritized over local media elements. It should be understood that any other approach for identifying elements where remote elements are prioritized over local elements may be used instead.

Process 900 begins at step 902. At step 904, the electronic device may identify remote media elements associated with the seed media element. Step 904 may involve identifying remote media elements using a same, similar, or different approach than those discussed above in connection with identifying step 810 of process 800 (FIG. 8).

Then, at step 906, the electronic device can determine which of the remote media elements are stored locally on the electronic device. In some embodiments, following step 906, the electronic device may associate the identified media elements that are stored on electronic device with their respective local copies at step 908. This way, the identified media elements may include both remote and local media elements. Following step 908, process 900 may end at step 910.

In other embodiments, process 900 may move to step 912 from step 906. At step 912, rather than associating remote media elements with their local copies, the electronic device may disassociate any locally stored media elements from those identified at step 904. This way, all of the media elements identified by the electronic device may correspond to media elements not already present on the electronic device. From step 912, process 900 may end at step 910.

While FIGS. 8 and 9 are described for identifying media elements, it should be understood that the disclosed processes may be used for identifying any other suitable type of element, such as address book contacts.

The described embodiments of the invention are presented for the purpose of illustration and not of limitation, and the invention is only limited by the claims which follow.

What is claimed is:

1. An electronic device for recommending a plurality of elements to a user based on a seed element, the electronic device comprising a display, a user input device, and control circuitry configured to:

identify the plurality of elements based at least in part on the seed element;

direct the display to present a graphical representation of the seed element, the graphical representation comprising a plurality of segments, wherein each of the segments is associated with at least one of the identified elements;

receive, from the user input device, a user selection of one of the segments; and perform an action based on the at least one of identified element associated with the selected segment; and for each particular element in the plurality of elements, identify the particular element based at least in part on a visual similarity of (1) a graphic associated with the particular element to (2) a portion of a seed element-associated image on which the graphical representation is based.

2. The electronic device of claim 1, wherein the graphical representation comprises a mosaic in which each particular tile of one or more tiles of the mosaic is selected based at least in part on both (a) a coloration of the particular tile and (b) a coloration of an image portion occurring within the image in an area corresponding to an area of the mosaic in which the particular tile occurs.

3. The electronic device of claim 2, wherein the mosaic comprises a plurality of album covers that are both associated with the identified elements and selected based on color similarities between the album covers and corresponding sub-areas of the image on which the graphical representation is based.

4. The electronic device of claim 2, wherein the electronic device is configured to identify the plurality of elements by:

identifying a group of elements based on the seed element, wherein the group of elements are each associated with a graphic; and narrowing down the group of elements using a mosaic-generating algorithm that operates based on comparisons of shades of the graphics to shades of portions of the image on which the graphical representation is based.

5. The electronic device of claim 1, wherein each of the segments is associated with a group of the identified elements, and wherein the action comprises:

presenting a display screen comprising the group of elements associated with the selected segment;

receiving a user selection of an element from the display screen; and taking an action associated with the selected element.

6. The electronic device of claim 1, wherein:

a first one of the segments is associated with a first attribute of the seed element; and a second one of the segments is associated with a second attribute of the seed element.

7. The electronic device of claim 1, wherein the plurality of elements comprise media elements, and wherein the action comprises at least one of: playing a preview of a media element, playing a full version of the media element, displaying information about the media element, and adding a media element to a playlist.

8. The electronic device of claim 1, wherein the plurality of elements comprise address book contacts, and wherein the action comprises at least one of: making a telephone call to an address book contact, providing an interface in which to text message the address book contact, and providing contact information for an address book contact.

9. Non-transitory machine-readable media for recommending a plurality of elements based on a seed element, the non-transitory machine-readable media comprising machine-readable instructions recorded thereon for:
  identifying the plurality of elements based at least in part on the seed element;
  displaying a graphical representation of the seed element, the graphical representation comprising a plurality of segments, wherein each of the segments is associated with at least one of the identified elements;
  receiving a user selection of at least one of the segments; and
  performing an action based on the at least one of identified elements associated with the at least one of the segments; and
  for each particular element in the plurality of elements, identifying the particular element based at least in part on a visual similarity of (1) a graphic associated with the particular element to (2) a portion of a seed element-associated image on which the graphical representation is based.

10. The non-transitory machine-readable media of claim 9, wherein the machine-readable instructions for identifying the plurality of elements comprises machine-readable instructions for:
  identifying a plurality of local elements; and
  identifying a plurality of remote elements.

11. The non-transitory machine-readable media of claim 9, wherein the machine-readable instructions for performing the action comprises machine-readable instructions for:
  determining whether the at least one identified element is stored locally; and
  responsive to determining that the at least one identified element is not stored locally, retrieving a preview of the at least one identified element from a server.

12. The non-transitory machine-readable media of claim 9, wherein the machine-readable instructions for performing the action comprises machine-readable instructions for:
  providing a display of the at least one identified element.

* * * * *